US011900346B1

(12) United States Patent
Eaton et al.

(10) Patent No.: US 11,900,346 B1
(45) Date of Patent: Feb. 13, 2024

(54) APPARATUSES AND METHODS FOR PAYMENT FOR CONSUMABLE CONTENT

(71) Applicant: Wells Fargo Bank N.A., San Francisco, CA (US)

(72) Inventors: Shane Duncan Eaton, Charlotte, NC (US); Daniel Alexander David, Charlotte, NC (US); Loftlon Worth, Huntersville, NC (US); Hunter Doolittle, Charlotte, NC (US); Todd Klapprodt, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 18 days.

(21) Appl. No.: 16/548,230

(22) Filed: Aug. 22, 2019

(51) Int. Cl.
*G06Q 20/12* (2012.01)
*G06Q 20/40* (2012.01)
*G06Q 20/10* (2012.01)
*G06F 16/903* (2019.01)

(52) U.S. Cl.
CPC ... *G06Q 20/1235* (2013.01); *G06F 16/90335* (2019.01); *G06Q 20/102* (2013.01); *G06Q 20/405* (2013.01)

(58) Field of Classification Search
CPC ............. G06Q 20/1235; G06Q 20/102; G06Q 20/405; G06F 16/90335
See application file for complete search history.

(56) References Cited

U.S. PATENT DOCUMENTS

| | | | | |
|---|---|---|---|---|
| 6,798,997 | B1 * | 9/2004 | Hayward | G06Q 30/0605 399/24 |
| 6,876,986 | B1 * | 4/2005 | Currans | G06Q 20/28 705/64 |
| 8,099,361 | B1 * | 1/2012 | Gupta | G06Q 40/02 705/40 |
| 8,401,904 | B1 * | 3/2013 | Simakov | G06Q 20/3572 705/16 |
| 9,336,518 | B1 * | 5/2016 | Martin | G06Q 20/1235 |
| 10,275,577 | B2 * | 4/2019 | Gorman | G06F 21/6209 |
| 10,521,815 | B1 * | 12/2019 | Joseph | G06Q 30/0235 |
| 2003/0126079 | A1 * | 7/2003 | Roberson | G06Q 20/403 705/40 |

(Continued)

FOREIGN PATENT DOCUMENTS

WO  WO-2017212339 A1 * 12/2017

*Primary Examiner* — Mamon Obeid
*Assistant Examiner* — Pierre L Maccagno
(74) *Attorney, Agent, or Firm* — K&L Gates LLP

(57) ABSTRACT

Methods, apparatuses, and computer program products are disclosed for effectuating payment for consumable content. An example method includes receiving a request for payment associated with a content source device and identifying a first user device associated with a first user accessing consumable content of the content source device. The method further includes transmitting an actionable payment notification to the first user device. In an instance in which the computing device receives responsive authorization from the first user device, the method includes transmitting a first real-time payment to the content source device. In an instance in which the computing device fails to receive responsive authorization from the first user device, the method includes causing access of the consumable content to the first user device to halt.

20 Claims, 5 Drawing Sheets

(56) References Cited

U.S. PATENT DOCUMENTS

| | | | | |
|---|---|---|---|---|
| 2004/0059643 | A1* | 3/2004 | Marti | G06Q 30/0601 |
| | | | | 705/26.1 |
| 2005/0147440 | A1* | 7/2005 | Nakanishi | G06K 15/1823 |
| | | | | 400/62 |
| 2005/0166056 | A1* | 7/2005 | Yamanaka | G06Q 30/04 |
| | | | | 713/176 |
| 2006/0280303 | A1* | 12/2006 | Gupte | H04N 21/835 |
| | | | | 380/239 |
| 2006/0282389 | A1* | 12/2006 | Gupte | G06Q 20/00 |
| | | | | 705/52 |
| 2012/0084210 | A1* | 4/2012 | Farahmand | G06Q 40/02 |
| | | | | 705/64 |
| 2013/0159133 | A1* | 6/2013 | Watanabe | G06Q 30/0631 |
| | | | | 705/26.7 |
| 2013/0166423 | A1* | 6/2013 | Beckert | G06Q 30/04 |
| | | | | 705/40 |
| 2014/0282713 | A1* | 9/2014 | Le Pelerin | H04N 21/4405 |
| | | | | 725/34 |
| 2016/0210599 | A1* | 7/2016 | Liberi | G06Q 20/102 |
| 2016/0351062 | A1* | 12/2016 | Mathews | G06Q 20/1235 |
| 2017/0308875 | A1* | 10/2017 | O'Regan | G06Q 20/40 |
| 2018/0192239 | A1* | 7/2018 | Liusaari | H04M 1/72403 |
| 2018/0300369 | A1* | 10/2018 | Svec | G06F 16/24544 |
| 2019/0290965 | A1* | 9/2019 | Oren | G06Q 20/3672 |
| 2019/0320234 | A1* | 10/2019 | Chong | G06Q 10/0631 |

* cited by examiner

APPARATUSES AND METHODS FOR PAYMENT FOR CONSUMABLE CONTENT

TECHNOLOGICAL FIELD

Example embodiments of the present invention relate generally to content delivery and, more particularly, to the use of real-time payments for consumable content.

BACKGROUND

Live events such as concerts, radio shows, and podcasts as well as streaming content (e.g., live or recorded) such as music, movies, television shows, etc. provide products or content that, once consumed, cannot be retrieved. Unlike physical goods that may be returned, the value of consumable content is reaped during viewing. By way of example, a viewer watching a video receives the benefit of the content during the video stream, the value of which is unable to be recouped by the content provider.

BRIEF SUMMARY

Traditional methods for funding or otherwise providing payment for consumable content rely upon previously-provided payment (e.g., buying a ticket to a live concert) and/or conventional payment methods (e.g., credit card payments, debit card payments, automated clearing house (ACH) payments, wire payments, etc.). Previously-provided payments for live events or other consumable content, however, are rigid in that they fail to allow for further transactions during the live event. By way of example, a person attending a live concert may purchase his or her ticket prior to attending the event. If, during the event, the performing act requests additional payment in order to continue performing longer than expected, to play a particular song, etc., the attendee cannot use the previously-provided payment (e.g., the ticket price) to contribute to the requested additional payment. Furthermore, the performing act cannot ensure that each attendee (i.e., receiving the benefit of the live concert) has contributed to the requested additional payment. Conventional payment methods also fail to provide adequate assurances to content sources or providers. By way of example, a person listening to a streaming song may use a credit card or other payment mechanism in order to provide adequate funding to the content provider while streaming. The listener, however, may provide invalid payment information or may later challenge or otherwise revoke the payment. In this way, content providers bear the risk associated with consumable content.

To solve these issues and others, example implementations of embodiments of the present invention may utilize irrevocable, real-time payments from a user accessing consumable content to the content source during content access. In operation, embodiments of the present disclosure may receive a request for payment associated with a content source device and, via consumable content identifiers and/or contextual analysis, identify one or more user devices accessing consumable content of the content source device. An actionable payment notification may be provided to the user devices and, in an instance in which a responsive authorization from the user device is provided, real-time payments may be transmitted to the content source device. In instances in which no responsive authorization is received, however, access to the consumable content by the user devices may halt. In this way, the inventors have identified that the advent of new payment technologies have created a new opportunity for solutions for effectuating payment for consumable content which were historically unavailable. In doing so, such example implementations confront and solve at least two technical challenges: (1) they provide increased options to consumers during access to consumable content, and (2) they reliably ensure irrevocable payment to consumable content providers.

Systems, apparatuses, methods, and computer program products are disclosed herein for effectuating payment for consumable content. In one embodiment, with reference to the claimed method, a method for effectuating payment may include receiving, via a computing device, a request for payment associated with a content source device. The method may further include identifying, via content evaluation circuitry of the computing device, a first user device associated with a first user accessing consumable content of the content source device, and transmitting, via payment circuitry of the computing device, an actionable payment notification to the first user device. In an instance in which the computing device receives responsive authorization from the first user device, the method may include transmitting, via the payment circuitry of the computing device, a first real-time payment to the content source device. In an instance in which the computing device fails to receive responsive authorization from the first user device, the method may include causing, via access circuitry of the computing device, access of the consumable content to the first user device to halt.

In some embodiments, identifying the first user device may include querying a content access database storing one or more consumable content identifiers.

In other embodiments, the method may include receiving, via contextual analysis circuitry of the computing device, one or more first contextual parameters of the first user device and one or more source contextual parameters of the content source device. The method may further include identifying, via the content evaluation circuitry of the computing device, the first user device based on the first contextual parameters and the source contextual parameters.

In some embodiments, the request for payment may include a payment threshold. In such an embodiment, the method may include causing, via access circuitry of the computing device, access of the consumable content to the first user device to halt in an instance in which the responsive authorization from the first user device fails to satisfy the payment threshold.

In other embodiments, the method may include identifying, via the content evaluation circuitry of the computing device, a second user device associated with a second user accessing consumable content of the content source device, and transmitting, via the payment circuitry of the computing device, an actionable payment notification to the second user device. In an instance in which the computing device receives responsive authorization from the second user device, the method may include transmitting, via the payment circuitry of the computing device, a second real-time payment to the content source device.

In some further embodiments, the method may include compiling, via the payment circuitry of the computing device, the first real-time payment and the second real-time payment. In an instance in which the compiled first and second real-time payments fail to satisfy the payment threshold, the method may include causing, via the payment circuitry of the computing device, return of the first real-time payment to the first user device and return of the second real-time payment to the second user device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
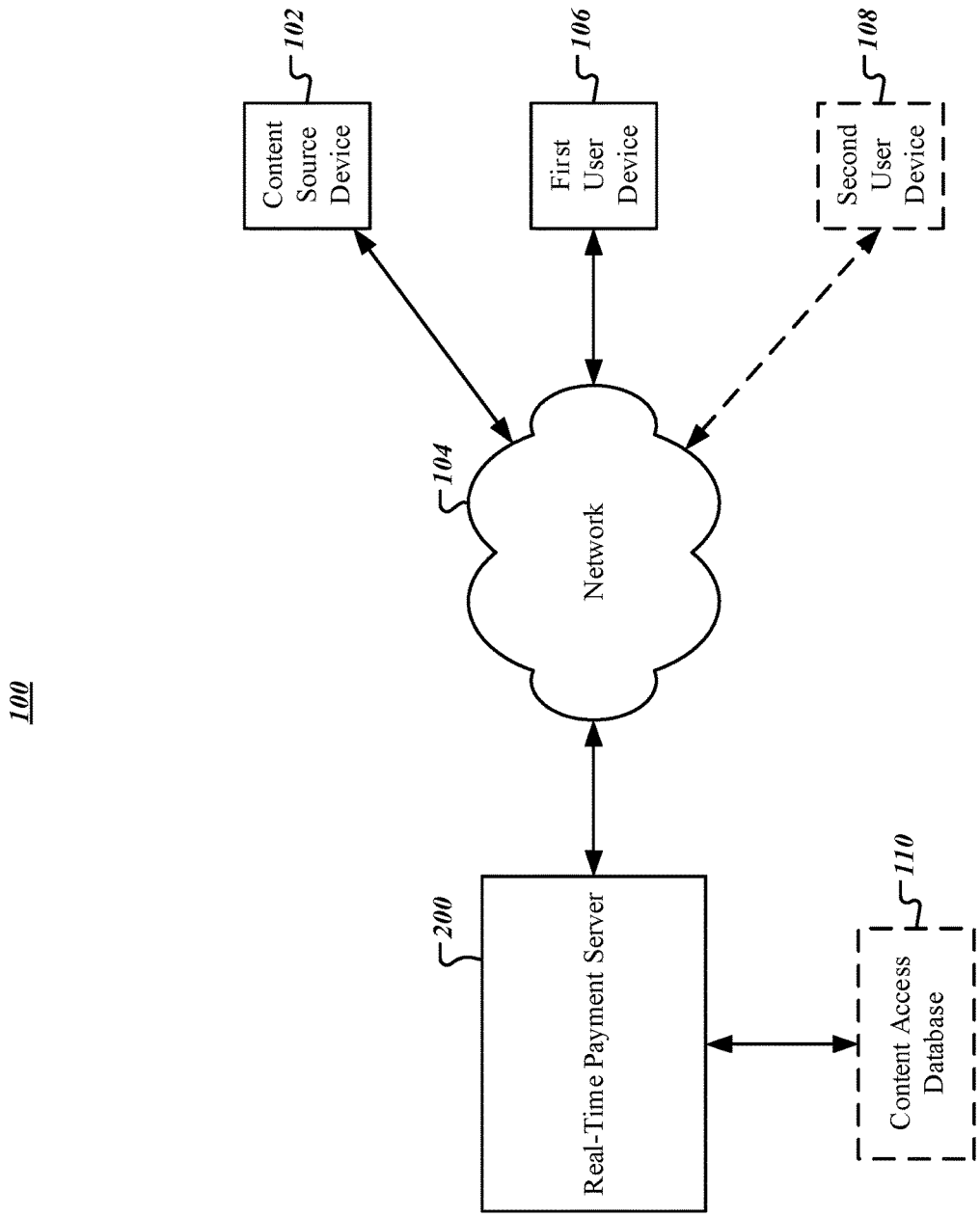
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a real-time payment server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by a real-time payment server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the real-time payment server 200 or other computing device via a network.

As used herein, the term "content source device" refers to any object, device, or system which may be in network communication with the real-time payment server, the first user device, and/or the second user device. For example, a content source device may be an external server or computing device (e.g., associated with a streaming service, live event, or the like) that may request, receive, and/or provide data (e.g., consumable content data or the like) to or from one of the devices described above. By way of example, a content source device may include a server of a streaming service that hosts or otherwise supplies consumable content to user devices connected thereto (e.g., a server supplying access to a video stream). In the instance of a live event, the content source device may refer to a server, device, etc. associated with the content source (e.g., a live performer)

and configured to communicate with user devices accessing the live content (e.g., attending the live event).

As used herein, the term "content access database" refers to a data structure or repository for storing content data, consumable content identifiers, user access data, and the like. Similarly, the "consumable content identifiers" of the content access database may refer to data generated by or relevant to a user device and associated user (e.g., account data, transaction data, subscription data, purchase data, or the like). The content access database may be accessible by one or more software applications of the real-time payment server 200.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, description is made to a "real-time payment" transmission or transaction initiated or otherwise caused by the embodiments of the present disclosure. A real-time payment may refer to a substantially simultaneous transfer of irrevocable funds from a sender to a recipient. While described herein as substantially simultaneous or occurring in "real-time," the present disclosure contemplates that a real-time payment may practically occur over a time frame of several seconds (e.g., or any duration). In some instances, a real-time payment may require additional time (e.g., in order to verify a destination device or account, due to system volume or other technological limitations, etc.) such that the completed transfer of funds requires several minutes or hours. In any event, a real-time payment as described herein refers to an irrevocable transfer of funds at a speed that is substantially faster than traditional payments methods. Additionally, a real-time payment may also refer to a transfer of irrevocable funds that may be immediately accessible and usable by a recipient. Unlike conventional payment methods that may appear in a user's account (e.g., as a memo-credit or the like) but cannot be used, funds transferred via a real-time payment may be immediately useable by a recipient.

Furthermore, the present disclosure acknowledges that a real-time payment system or RTP® may refer to a particular payment network or digital commerce system owned by The Clearing House (TCH). The embodiments of the present disclosure, however, do not refer to or require a particular payment network or digital commerce system and, instead, refer to the substantially simultaneous and irrevocable transfer of funds as described above.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a real-time payment server 200) communicably connected via a network 104 to a content source device 102, a first user device 106, and, in some embodiments, a second user device 108. The example system 100 may also include a content access database 110 that may be hosted by the real-time payment server 200 or otherwise hosted by devices in communication with the real-time payment server 200.

The real-time payment 200 may include circuitry, networked processors, or the like configured to perform some or all of the apparatus-based (e.g., real-time payment server-based) processes described herein, and may be any suitable network server and/or other type of processing device. In this regard, real-time payment server 200 may be embodied by any of a variety of devices. For example, the real-time payment server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the real-time payment server 200 may be located remotely from the first user device 106, the content source device 102, the second user device 108, and/or content access database 110, although in other embodiments, the real-time payment server 200 may comprise the first user device 106, the content source device 102, the second user device 108, and/or the content access database 110. The real-time payment server 200 may, in some embodiments, comprise several servers or computing devices performing interconnected and/or distributed functions. Despite the many arrangements contemplated herein, the real-time payment server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 106 may refer to a user device associated with a first user and may be a cellular telephone (e.g., a smartphone and/or other type of mobile telephone), laptop, tablet, electronic reader, e-book device, media device, wearable, smart glasses, smartwatch, or any combination of the above. Similarly, the second user device 108 may refer to a user device associated with a second user and may also be a cellular telephone (e.g., a smartphone and/or other type of mobile telephone), laptop, tablet, electronic reader, e-book device, media device, wearable, smart glasses, smartwatch, or any combination of the above. Although only a first user device 106 and a second user device 108 are illustrated, the example system 100 may include any number of user devices associated with the same user or any number of respective other users. By way of example, in an instance in which the example system 100 operates to crowdsource (e.g., receive real-time payments for a plurality of user devices) a live event, the real-time payment server 200 may be in communication with a plurality of user devices.

The content source device 102, as defined above, may be associated with any entity (e.g., content source) that may be in network communication with the real-time payment server 200, the first user device 106, and/or the second user device 108. For example, the content source device 102 may be a server or computing device (e.g., associated with a streaming service, live performance, or other 3$^{rd}$ party) that may request, receive, and/or provide data (e.g., consumable content data or the like) to or from the first user device 106 and/or the second user device 108 as described above.

The content access database 110 may be stored by any suitable storage device configured to store some or all of the information described herein (e.g., memory 204 of the real-time payment server 200 or a separate memory system separate from the real-time payment server 200, such as one or more database systems, backend data servers, network databases, cloud storage devices, or the like provided by another device (e.g., online application or 3$^{rd}$ party provider) or the first or second user devices 106, 108). The content access database 110 may comprise data received from the real-time payment server 200 (e.g., via a memory 204 and/or processor(s) 202), the first user device 106, or the second user device 108, and the corresponding storage device may thus store this data.

Figure 2:
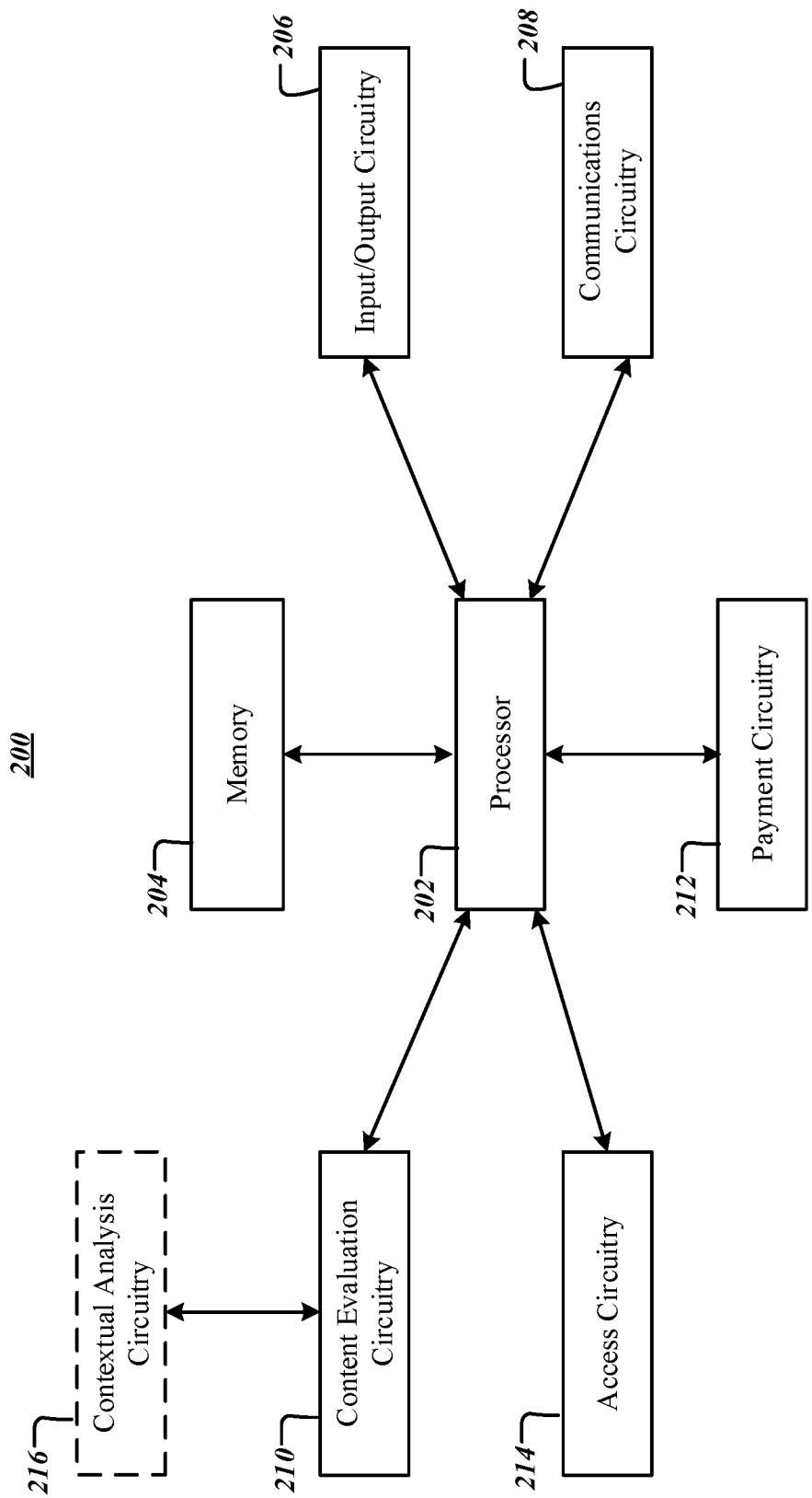
FIG. 2 illustrates a schematic block diagram of example circuitry that may perform various operations, in accordance with some example embodiments described herein.

As illustrated in FIG. 2, the real-time payment server 200 may include a processor 202, a memory 204, communications circuitry 208, and input/output circuitry 206. Moreover, the real-time payment server 200 may include content evaluation circuitry 210, payment circuitry 212, access circuitry 214, and, in some embodiments, contextual analysis circuitry 216. The real-time payment server 200 may be configured to execute the operations described below in connection with FIGS. 3-5. Although components 202-216 are described in some cases using functional language, it should be understood that the particular implementations necessarily include the use of particular hardware. It should also be understood that certain of these components 202-216 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the real-time payment server 200 may be housed within the first user device 106, the second user device 108, and/or the content source device 102. It will be understood in this regard that some of the components described in connection with the real-time payment server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the real-time payment server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the real-time payment server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the real-time payment server 200 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the real-time payment server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The real-time payment server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the real-time payment server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the real-time payment server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The content evaluation circuitry 210 includes hardware components designed to identify user devices accessing consumable content of a content source device. The content evaluation circuitry 210 may utilize processing circuitry, such as the processor 202, to perform its corresponding operations, and may utilize memory 204 to store collected information. By way of example, in some instances, the content evaluation circuitry 210 may query the content access database 110 to receive consumable content identifiers. The content evaluation circuitry 210 may identify one of more users accessing consumable content of the content source device based upon the consumable content identifiers. In some embodiments, the content evaluation circuitry 210 may further comprise contextual analysis circuitry 216. The contextual analysis circuitry 216 may be configured to receive contextual parameters associated with user devices (e.g., first user device 106) and/or content source devices (e.g. content source device 102). The contextual analysis circuitry 216 may further be configured to identify a first user device accessing consumable content of a content source device based upon these contextual parameters.

The payment circuitry 212 includes hardware components designed to generate and transmit real-time payments. The payment circuitry 212 may be configured to, in an instance in which the real-time payment server 200 receives responsive authorization from a user device (e.g., first user device 106), transmit a first real-time payment to a content source device 102. The payment circuitry 212 may utilize processing circuitry, such as the processor 202, to perform its corresponding operations, and may utilize memory 204 to store collected information.

Access circuitry 214 includes hardware components designed to control access of consumable content to the first user device 106, the second user device 108, and/or other devices not illustrated in FIGS. 1-2. For example, the access circuitry 214 may, in an instance in which the real-time payment server 200 fails to receive responsive authorization from a user device, halt access of consumable content to said user device. Access circuitry 214 may utilize processing circuitry, such as the processor 202, to perform its corresponding operations, and may utilize memory 204 to store collected information.

It should also be appreciated that, in some embodiments, the content evaluation circuitry 210, payment circuitry 212, access circuitry 214, or contextual analysis circuitry 216, may include a separate processor, specially configured field programmable gate array (FPGA), or application specific interface circuit (ASIC) to perform its corresponding functions.

In addition, computer program instructions and/or other type of code may be loaded onto a computer, processor or other programmable risk maintenance server's circuitry to produce a machine, such that the computer, processor other programmable circuitry that execute the code on the machine create the means for implementing the various functions, including those described in connection with the components of real-time payment server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Payment for Consumable Content

Figure 3:
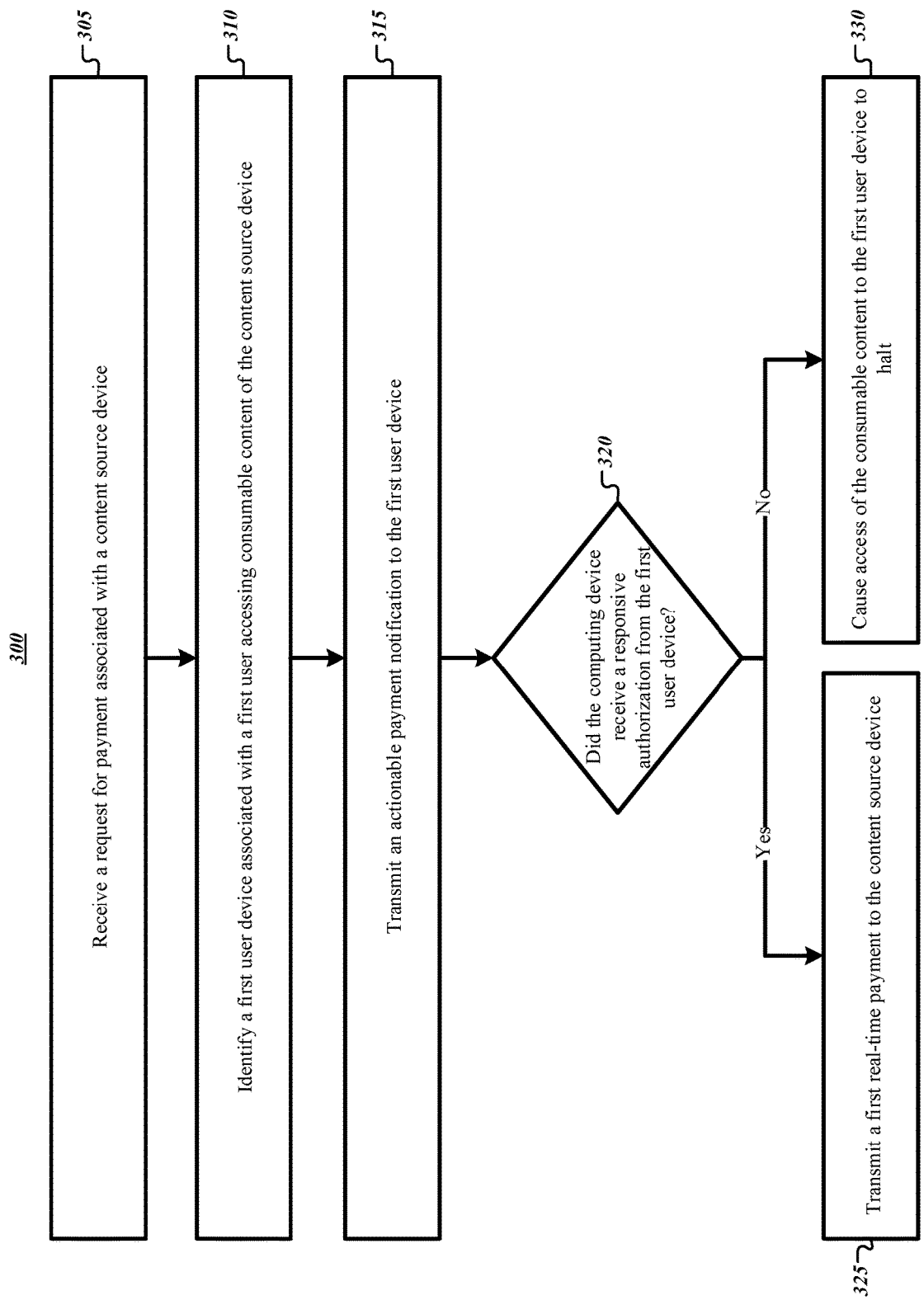
FIG. 3 illustrates an example flowchart for effectuating payment for consumable content, in accordance with some example embodiments described herein.

FIG. 3 illustrates a flowchart containing a series of operations for effectuating payment for consumable content. The operations illustrated in FIG. 3 may, for example, be performed by, with the assistance of, and/or under the control of an apparatus (e.g., real-time payment server 200), as described above. In this regard, performance of the operations may invoke one or more of processor 202, memory 204, input/output circuitry 206, communications circuitry 208, content evaluation circuitry 210, payment circuitry 212, access circuitry 214, and/or contextual analysis circuitry 216.

As shown in operation 305, the apparatus (e.g., real-time payment server 200) includes means, such as input/output circuitry 206, communications circuitry 208, or the like, for receiving a request for a payment associated with a content source device 102. In some example embodiments, the communications circuitry 208 may receive a request for payment from the content source device 102 that includes information regarding a first user device 106 and/or a second user device 108 accessing consumable content of the content source device 102. In such an embodiment, the request for payment may include account details (e.g., user name, user account information, user address, etc.) associated with a user device (e.g., and an associated user). In other embodiments, the communications circuitry 208 may receive a request for payment from the content source device 102 that does not include information regarding a user device or includes non-identifying information (e.g., information that does not identify a particular user device).

Thereafter, as shown in operation 310, the apparatus (e.g., real-time payment server 200) includes means, such as input/output circuitry 206, content evaluation circuitry 210, contextual analysis circuitry 216, or the like, for identifying a first user device 106 associated with a first user accessing consumable content of the content source device 102. As described above, one or more user devices (e.g., the first user device 106) may be communicably coupled with the content source device 102 via the network 104 such that the user devices (e.g., first user device 106) may access consumable content of the content source device 102. By way of example, the first user device 106 may access a live stream (e.g., podcast, video steam, music stream, etc.) hosted by the content source device 102. As described hereafter with reference to FIG. 4, the real-time payment server 200 may be configured to identify the first user device 106 by receiving identifying user data from the content source device 102 with a request for payment as described above with reference to operation 305 and/or may query a content access database 110 as described hereafter.

In other embodiments, one or more users associated with user devices (e.g., the first user device 106) may attend a live event (e.g., concert, performance, or the like) such that the one or more user devices (e.g., first user device 106 and/or second user device 108) may not operate to display the consumable content of the content source device 102. By way of example, a first user associated with the first user device 106 may attend a live performance such that the first user device 106 is present at the live performance. As described hereafter with reference to FIG. 4, the real-time payment server 200 may receive one or more contextual parameters of the first user device 106 and/or the content source device 102 in order to identify the first user device 106 as a device accessing consumable content of the content source device 102. While the operations of FIG. 3 are described herein with reference to the first user device 106, the present disclosure contemplates that any number of user devices (e.g., second user device 108) may also simultaneously access consumable content of the content source device 102. For example, a plurality of user devices may simultaneously stream content hosted by the content source device 102 or a plurality of users and associated user devices may simultaneously attend a live performance.

Thereafter, as shown in operation 315, the apparatus (e.g., real-time payment server 200) includes means, such as processor 202, payment circuitry 212, or the like, for transmitting an actionable payment notification to the first user device 106. As described above, in some embodiments, the request for payment received from the content source device 102 at operation 305 may include data identifying one or more users (e.g., first user device 106) accessing consumable content of the content source device 102. In such an embodiment, the request for payment may include an actionable payment notification for transmission to the first user device 106. For example, the content source device 102 may prepare an actionable payment notification (e.g., an invoice with payment input for such an embodiment) based upon user data associated with the first user device 106 (e.g., user name, address, account information, etc.). In such an embodiment, the real-time payment server 200 may receive the request for payment and actionable payment notification and transmit the actionable payment notification to the first user device 106.

In some instances, however, the request for payment from the content source device 102 may not include the requisite user information to generate an actionable payment notification. With continued reference to a live performance, a first user associated with the first user device 106 may purchase a ticket to attend the live performance with cash or another non-identifiable form of payment. As such, the real-time payment server 200 may, as described hereafter with reference to FIG. 4, identify the first user device 106 and generate an actionable payment notification for transmission to the first user device 106. For example, the real-time payment server 200 may analyze one or more contextual parameters of the first user device 106 (e.g., location data, social media data, device proximity data, internet protocol (IP) data, or the like) to identify the first user device 106 as a device accessing consumable content of the content source device 102 (e.g., the location of the first user device 106 coincides with the location of the live performance). In such an embodiment, the real-time payment server 200 may then generate an actionable payment notification for transmission to the first user device 106.

The actionable payment notifications as described herein may refer to a communication (e.g., email, text message, or the like) to which a user that includes one or more inputs for user response. For example, the actionable payment notification may, in some embodiments, include a text message transmitted by the real-time payment server 200 to the first user device 106 that includes a responsive payment input (e.g., payment link, input button, etc.) configured to authorize a real-time payment. In some embodiments, the actionable payment notification may include a user input (e.g., "authorize payment?") that, when selected, transmits a responsive authorization to the real-time payment server 200. In other embodiments, the actionable payment notification may include a plurality of user inputs. In such an embodiment, the plurality of user inputs may include options to authorize payment as well as options to refuse authorization. In other embodiments, the plurality of user inputs may provide options for authorizing real-time payments of varying amounts. In some still further embodiments, the actionable payment notification may allow for a free text user input (e.g., "insert real-time payment amount") such that the user may authorize a real-time payment of a particular amount. While described herein as an actionable payment notification, the embodiments of the present disclosure contemplate that any form of communication may be used to authorize a real-time payment by the real-time payment server 200.

Thereafter, as shown in operation 320, the apparatus (e.g., real-time payment server 200) includes means, such as the processor 202, the communications circuitry 208, or the like, or the like, for determining if the real-time payment server 200 received a responsive authorization from the first user device 106. As described above, in some embodiments the actionable payment notification may include an input option for that, when selected, transmits an instruction that refuses authorization. In such an embodiment, the real-time payment server 200 may receive explicit instructions refusing to authorize a real-time payment and proceed to operation 330 as described hereafter. In other embodiments, the actionable payment notification may only include an option to authorize the real-time payment and/or a user associated with the first user device 106 may fail to take any action (e.g., fail to respond to the actionable payment notification). In such an embodiment, the real-time payment server 200 may, following the expiration of a response time period, proceed to operation 330 as described hereafter.

In some embodiments, as shown in operation 325, the apparatus (e.g., real-time payment server 200) includes means, such as processor 202, memory 204, payment circuitry 212, or the like, for transmitting a first real-time payment to the content source device 102. As described above, in an instance in which the real-time payment server 200 receives a responsive authorization from the first user device 106, the payment circuitry 212 may transmit (e.g., or cause transmission of) a real-time payment to the content source device 102. Based upon the input from the first user, the type of actionable payment notification, etc., the real-time payment server 200 may, in some embodiments, transmit a real-time payment to the content source device 102 in full satisfaction of the request for payment received at operation 305. By way of continued example, in instances in which the content source device 102 is hosting or otherwise providing streaming content to a first user device 106 connected thereto, the request for payment received by the real-time payment server 200 at operation 305 may be associated with a fee that is to be satisfied by the first user device 106 alone (e.g., a standard subscription fee or the like). In such an embodiment, the transmission of the real-time payment at operation 325 may similarly satisfy this fee dictated by the request for payment.

Figure 5:
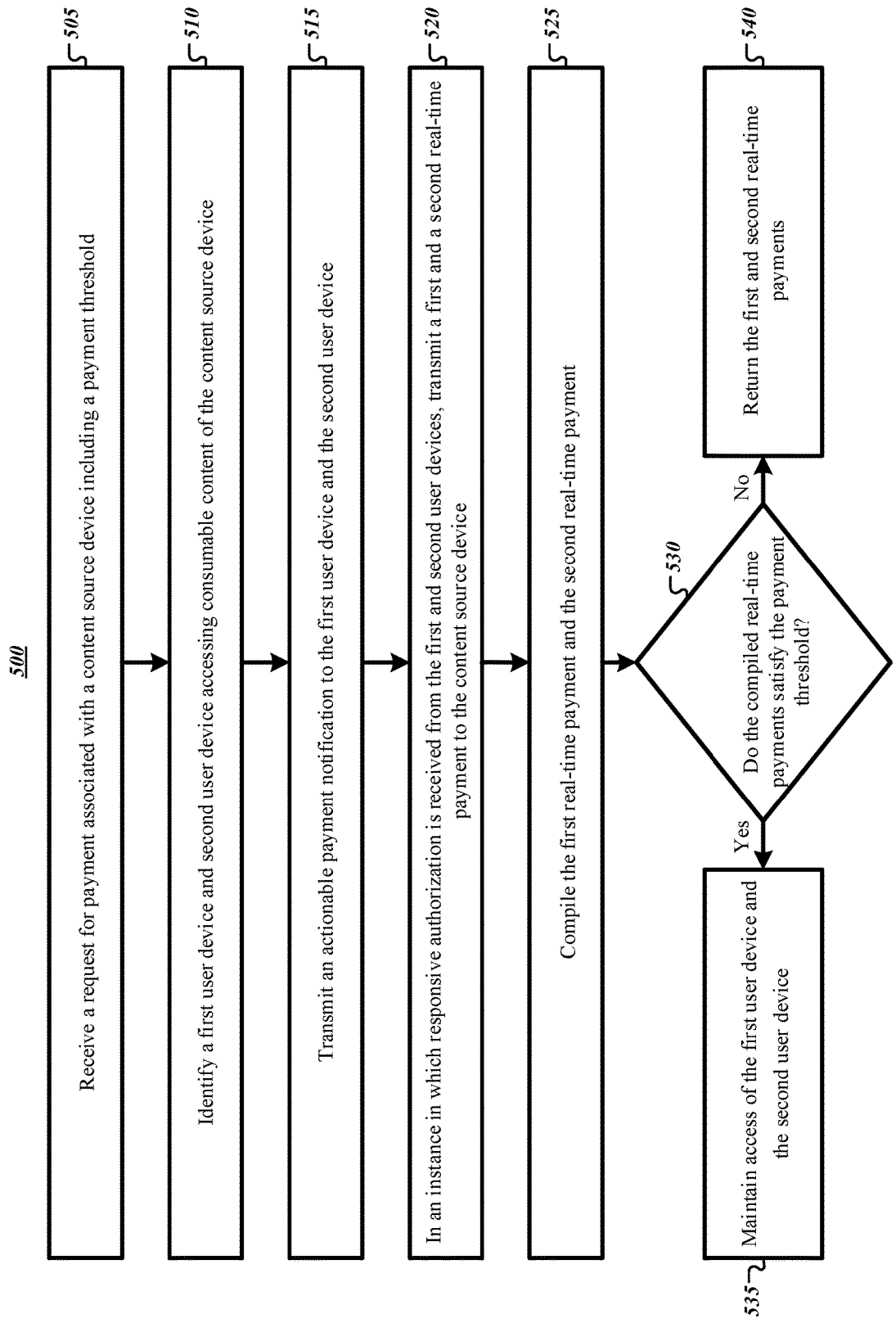
FIG. 5 illustrates an example flowchart for content payment threshold analysis, in accordance with some example embodiments described herein.

In other embodiments as described hereafter with reference to FIG. 5, the real-time payment server 200 may be configured to transmit a real-time payment to the content source device 102 in partial satisfaction of the request for payment received at operation 305. By way of continued example, in instances in which the content source device 102 is associated with a live performance, the request for payment received by the real-time payment server 200 at operation 305 may be associated with a fee (e.g., payment threshold) that is to be satisfied by respective payments from each user (e.g., and associated user device) attending the live performance. Said differently, the request for payment transmitted by the content source device 102 associated with a live performance may be such that each real-time payment authorized by each respective user device operates to crowd-source funding for the request for payment.

In an instance in which the real-time payment server 200 fails to receive responsive authorization from the first user device, as shown in operation 330, the apparatus (e.g., real-time payment server 200) includes means, such as processor 202, communications circuitry 208, access circuitry 214, or the like, for causing access of the consumable content to the first user device 106 to halt. By way of example, in some embodiments, the real-time payment server may transmit instructions to the content source device 102 causing the content source device 102 to halt transmission to or communication with the first user device 106. In embodiments in which the first user device 106 comprises the real-time payment server, communications circuitry 208 may cause access to the consumable content to halt (e.g., cause display of the consumable content to be obstructed, obscured, and/or halted).

Figure 4:
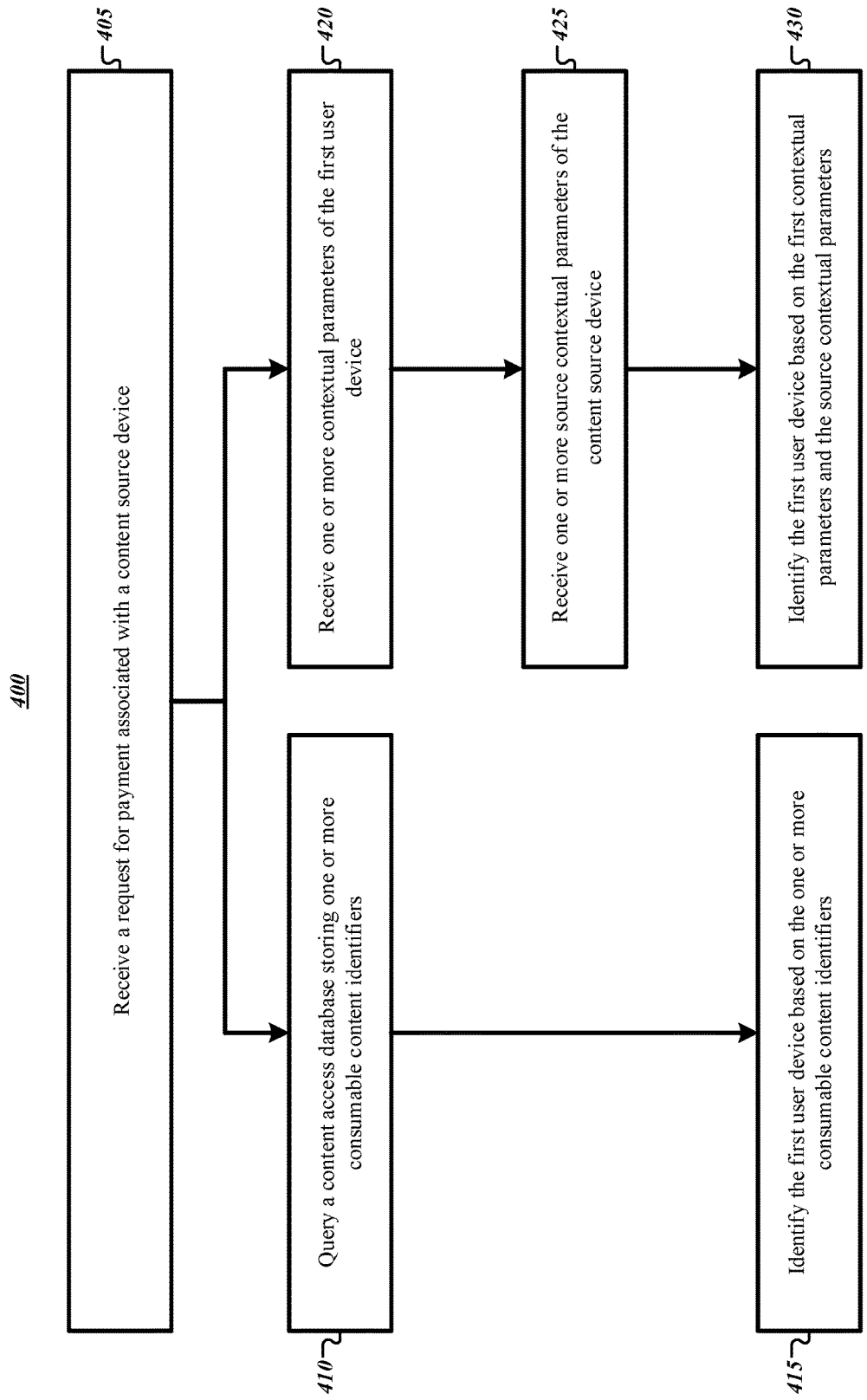
FIG. 4 illustrates an example flowchart for identifying a user device accessing consumable content, in accordance with some example embodiments described herein.

Turning next to FIG. 4, a flowchart is shown for identifying a first user device 106 accessing consumable content of the content source device 102. The operations illustrated in FIG. 4 may, for example, be performed by, with the assistance of, and/or under the control of an apparatus (e.g., real-time payment server 200), as described above. In this regard, performance of the operations may invoke one or more of processor 202, memory 204, input/output circuitry 206, communications circuitry 208, content evaluation circuitry 210, payment circuitry 212, access circuitry 214, and/or contextual analysis circuitry 216.

As shown in operation 405, the apparatus (e.g., real-time payment server 200) includes means, such as input/output circuitry 206, communications circuitry 208, or the like, for receiving a request for a payment associated with a content source device 102. As described above with reference to FIG. 3, the communications circuitry 208 may receive a request for payment from the content source device 102 that includes information regarding a first user device 106 and/or a second user device 108 accessing consumable content of the content source device 102. In some embodiments, the request for payment may include account details (e.g., user name, user account information, user address, etc.) associated with a user device (e.g., and an associated user). In other embodiments, the communications circuitry 208 may receive a request for payment from the content source device 102 that does not include information regarding the user device.

Thereafter, as shown in operations 410, 415 the apparatus (e.g., real-time payment server 200) includes means, such as processor 202, content evaluation circuitry 210, or the like, for querying a content access database 110 storing one or more consumable content identifiers and identifying the first user device 106 based upon the one or more consumable content identifiers. As described above, in some embodiments, the request for payment received at operation 405 may include account information associated with the first user and first user device 106. By way of example, the request for payment may include, from an account set up procedure, prior user input, or the like, user account information such that the content evaluation circuitry 210 may identify the first user device 106 based upon the request for payment. In other embodiments, however, the request for payment may only provide some or no information related to the first user and associated first user device 106. As such, the real-time payment server 200 may query a content access database 110 storing one or more consumable content identifiers.

With regard to embodiments in which a content source device 102 is hosting consumable content, the request for payment may only identify a particular user or user device (e.g., first user device 106) without account information. As such, the content evaluation circuitry 210 may query the content access database to retrieve one or more consumable content identifiers. The one or more consumable content identifiers may include one or more data sources indicative of the first user and associated first user device's access to consumable content. By way of example the one or more consumable content identifiers may include account data, transaction data, or the like. By way of a more particular example, the content evaluation circuitry 210 may query the content access database 110 to identify a subscription associated with the first user and first user device 106. Based upon the subscription associated with the consumable content hosted by the content source device 102, the content evaluation circuitry may identify the first user device 106 (e.g., having the subscription data) as a user device accessing consumable content at operation 415.

With regard to embodiments in which a content source device 102 is associated with a live performance (e.g., consumable content), the content evaluation circuitry 210 may query the content access database to retrieve one or more consumable content identifiers associated with transaction data. By way of continued example, the content evaluation circuitry 210 may query the content access database 110 to identify a ticket purchase (e.g., transaction data) associated with the first user and first user device 106. Based upon the ticket purchase for access to the consumable content of the live performance, the content evaluation circuitry may identify the first user device 106 as a user device accessing consumable content at operation 415. While described herein with reference to account data and transaction data, the present disclosure contemplates that the content access database 110 may store any number of consumable content identifiers used in identifying user devices with access to consumable content.

In some instances, however, the request for payment from the content source device 102 may not include the requisite user information or the content access database described above may not include adequate user information to identify the first user device 106 as accessing consumable content. With continued reference to a live performance, a first user associated with the first user device 106 may purchase a ticket to attend the live performance with cash or another non-identifiable form of payment. As such, the apparatus (e.g., real-time payment server 200) includes means, such as processor 202, content evaluation circuitry 210, contextual analysis circuitry 216, or the like, for receiving one or more contextual parameters (e.g., location data, social media data, device proximity data, internet protocol (IP) data, or the like) of the first user device 106 at operation 420 and receiving one or more source contextual parameters (e.g., location data, social media data, device proximity data, internet protocol (IP) data, or the like) of the content source device 102 at operation 425.

The contextual analysis circuitry 216, in some embodiments, may receive contextual parameters associated with the location data of the first user device 106 and/or the content source device 102 at operations 420, 425. By way of example, the real-time payment server 200 may receive location data from the first user device 106 (e.g., global positioning system (GPS) data from a mobile device, an internet protocol (IP) address of the mobile device, etc.) indicating the location of the first user. Similarly, the contextual analysis circuitry 216 may receive location data from the content source device 102 (e.g., with the request for payment or otherwise) and compare the respective locations of the first user device 106 and the content source device 102. In an instance in which the location data of the first user device 106 sufficiently corresponds to the location of the content source device 102 (e.g., within one or more proximity thresholds), the content evaluation circuitry 210 may identify the first user device 106 based on the first contextual parameters and the source contextual parameters (e.g., location data) at operation 430.

In some embodiments, the real-time payment server 200 may receive social media data from the first user device 106. By way of example, the contextual analysis circuitry 216 may receive comments, messages, posts, or the like of the first user device 106 associated with the consumable content (e.g., "this band tonight is great," "having fun at the concert uptown," or the like). The contextual analysis circuitry 216 may compare the social media data of the first user device 106 with the consumable content provided by the content source device 102. In an instance in which the social media data of the first user device 106 sufficiently corresponds to the consumable content provided by the content source device 102, the content evaluation circuitry 210 may identify the first user device 106 based on the first contextual parameters (e.g. social media data) at operation 430.

In some embodiments, the real-time payment server 200 may receive device proximity data from the first user device 106, the second user device 108, and/or a plurality of other user devices located proximate the first user device 106. By way of example, the contextual analysis circuitry 216 may receive location data from the first user device 106 (e.g., global positioning system (GPS) data from a mobile device, an internet protocol (IP) address of the mobile device, etc.) indicating the location of the first user as well as similar location data from other user devices. Although the first user device 106 may purchase a ticket to attend the live performance with cash or another non-identifiable form of payment, the real-time payment server 200 may receive account data or transaction data from the second user device 108 and/or other user devices (e.g., the request for payment to the second user device 108 includes account data for the second user or the like). As such, the contextual analysis circuitry 216 may compare the proximity data (e.g., the respective locations of proximate user devices) to determine if the first user device 106 is in sufficient proximity to the second user device 108 such that the first user device 106 is identified as also accessing consumable content. If so, the content evaluation circuitry 210 may identify the first user device 106 based on the first contextual parameters (e.g., proximity data) at operation 430.

Turning next to FIG. 5, a flowchart is shown for content payment threshold analysis. The operations illustrated in FIG. 5 may, for example, be performed by, with the assistance of, and/or under the control of an apparatus (e.g., real-time payment server 200), as described above. In this regard, performance of the operations may invoke one or more of processor 202, memory 204, input/output circuitry 206, communications circuitry 208, content evaluation circuitry 210, payment circuitry 212, access circuitry 214, and/or contextual analysis circuitry 216.

As shown in operation 505, the apparatus (e.g., real-time payment server 200) includes means, such as input/output circuitry 206, communications circuitry 208, or the like, for receiving a request for payment associated with a content source device 102 including a payment threshold. As described above, in instances in which the content source device 102 is associated with a live performance, the request for payment received by the real-time payment server 200 at operation 305 may be associated with a fee (e.g., payment threshold) that is to be satisfied by respective payments from each user (e.g., and associated user device) attending the live performance. Said differently, the request for payment transmitted by the content source device 102 associated with a live performance may be substantially such that each real-time payment authorized by each respective user device operates to crowdsource funding for the request for payment. While described herein with reference to crowdsourcing payment for a live performance, the methods described herein may be equally applicable to consumable content streamed or hosted by the content source device 102.

In some embodiments, however, the payment threshold may further define minimum contributions for each user device (e.g., first user device 106). By way of example, a content source device 102 hosting a stream of consumable may require that each user device accessing said stream authorize (e.g., via the actionable payment notifications described above) a real-time payment having a value that exceeds the minimum. In an instance in which the responsive authorization from the first user device 106, for example, fails to satisfy the payment threshold, the access circuitry 214 may cause access of the consumable content to the first user device 106 to halt. In this way, the content source device 102 may operate to ensure that each user device accessing consumable content contributes equally.

Thereafter, as shown in operation 510, the apparatus (e.g., real-time payment server 200) includes means, such as input/output circuitry 206, content evaluation circuitry 210, contextual analysis circuitry 216, or the like, for identifying a first user device 106 associated with a first user and a second user device 108 accessing consumable content of the content source device 102. As described above with reference to operation 310, one or more user devices (e.g., the first user device 106 and the second user device 108) may be communicably coupled with the content source device 102 via the network 104 such that the user devices may access consumable content of the content source device 102. As described above with reference to FIG. 4, the real-time payment server 200 may be configured to identify the first user device 106 and the second user device 108 by receiving identifying user data from the content source device 102 with a request for payment as described above with reference to operation 305 and/or may query a consumable content access database 110. While described herein with reference to the first user device 106 and the second user device 108, the present disclosure contemplates that the payment threshold analysis embodiments described herein may be equally applicable to any number of user devices accessing the consumable content of the content source device 102.

Thereafter, as shown in operation 515, the apparatus (e.g., real-time payment server 200) includes means, such as processor 202, payment circuitry 212, or the like, for transmitting an actionable payment notification to the first user device 106 and the second user device 108. As described above, in some embodiments, the request for payment received from the content source device 102 at operation 505 may include data identifying one or more users (e.g., first user device 106 and second user device 108) accessing consumable content of the content source device 102. In such an embodiment, the request for payment may include an actionable payment notification for transmission to the first user device 106 and the second user device 108 (e.g., any number of user devices). For example, the content source device 102 may prepare an actionable payment notification (e.g., an invoice with payment input for such an embodiment) based upon user data associated with the first user device 106 and the second user device 108 (e.g., user names, addresses, account information, etc.). In such an embodiment, the real-time payment server 200 may receive the request for payment and actionable payment notification and transmit the actionable payment notification to the first user device 106 and the second user 108.

In some embodiments, as shown in operation 520, the apparatus (e.g., real-time payment server 200) includes means, such as processor 202, memory 204, payment circuitry 212, or the like, for transmitting a first real-time payment and a second real-time payment to the content source device 102. As described above, in an instance in which the real-time payment server 200 receives a responsive authorization from the first user device 106 and the second user device 108, the payment circuitry 212 may transmit (e.g., or cause transmission of) a real-time payment to the content source device 102. As shown in operation 525, the apparatus (e.g., real-time payment server 200) includes means, such as processor 202, memory 204, payment circuitry 212, or the like, for compiling the first real-time payment and the second real-time payment. As described above, in some instances, the first real-time payment alone may be in partial satisfaction of the request for payment received at operation 505 (e.g., fails to satisfy the payment threshold). As such, at operations 525, 530, the payment circuitry 212 may compile the real-time payments (e.g., in escrow or otherwise) and compare the compiled real-time payments with the payment threshold. In this way, the compiled real-time payments authorized by each respective user device operate to crowdsource funding for the request for payment with payment threshold. While described with reference to first and second real-time payments, the present disclosure contemplates that a plurality of real-time payments transmitted by respective user devices may be compiled at operation 525 (e.g., concert attendees or the like).

In an instance in which the compiled real-time payments satisfy the payment threshold, as shown in operation 535, the apparatus (e.g., real-time payment server 200) includes means, such as processor 202, communications circuitry 208, access circuitry 214, or the like, for maintaining access of the first user device 106 and the second user device 108 (e.g., and any other contributing user devices) to the consumable content (e.g., continuing to stream consumable content, continuing to perform a live concert, etc.). In an instance in which the compiled real-time payments fail to satisfy the payment threshold, as shown in operation 540, the apparatus (e.g., real-time payment server 200) includes means, such as processor 202, communications circuitry 208, access circuitry 214, or the like, for returning the first real-time payment and the second real-time payment to respective user devices. As would be evident to one of ordinary skill in the art in light of the present disclosure, in instances in which the attempt by the content source device 102 fails to successfully crowdsource funding from user devices accessing consumable content, the real-time payment server 200 may operate to cause return of the real-time payments given that consumable content access will similarly halt.

As described above, various technical challenges are surmounted via technical solutions contemplated herein. For instance, example implementations of embodiments of the present invention utilize irrevocable, real-time payments from a user accessing consumable content to the content source during content access. In operation, embodiments of the present disclosure receive a request for payment associated with a content source device and, via consumable content identifiers and/or contextual analysis, identify one or more user devices accessing consumable content of the content source device. An actionable payment notification may be provided to the user devices and, in an instance in which a responsive authorization from the user device is provided, real-time payments may be transmitted to the content source device. In instances in which no responsive authorization is received, however, access to the consumable content by the user devices may halt. In this way, the inventors have identified that the advent of new payment technologies have created a new opportunity for solutions for effectuating payment for consumable content which were historically unavailable. In doing so, such example implementations confront and solve at least two technical challenges: (1) they provide increased options to consumers during access to consumable content, and (2) they reliably ensure irrevocable payment to consumable content providers.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the real-time payment server 200 and executed by a processor 202 of the real-time payment server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method performed by a real-time payment server of a real-time payment system, the computer-implemented method comprising:

providing, via access circuitry of the real-time payment server of the real-time payment system, a first user device of the real-time payment system with access to consumable content of a content source device of the real-time payment system, wherein the consumable content comprises streaming content associated with a live event, wherein the first user device is associated with a first user, and wherein the real-time payment server is communicatively coupled, via a network, to the content source device, the first user device, and a second user device;

receiving, via communications circuitry of the real-time payment server, a request for payment from the content source device, wherein the request for payment relates to the first user device and the second user device of the real-time payment system, wherein the second user device is associated with a second user;

querying, via contextual analysis circuitry of the real-time payment server a content access database to identify transaction data;

determining, via the contextual analysis circuitry, that the second user device is accessing the consumable content based on the transaction data indicating a ticket purchase for access to the consumable content associated with the second user device;

receiving, at the contextual analysis circuitry and from the first user device and the second user device, device proximity data comprising global positioning system data or internet protocol address data;

receiving, at the contextual analysis circuitry and from the first user device, social media data comprising a comment, a message, or a post associated with the consumable content, comparing, via the contextual analysis circuitry, the device proximity data of the first user device with the device proximity data of the second user device to determine that the first user device is within a threshold proximity of the second user device;

comparing, via the contextual analysis circuitry, the social media data with the consumable content to determine that the social media data corresponds to the consumable content;

identifying, via content evaluation circuitry of the real-time payment server and based on the first user device being within the threshold proximity of the second user device and the social media data received from the first user device corresponding to the consumable content, that the first user device associated with the first user is accessing the consumable content of the content source device;

transmitting, via payment circuitry of the real-time payment server, an actionable payment notification to the first user device in response to identifying that the first user device is accessing the consumable content based on the first user device being within the threshold proximity of the second user device and the social media data received from the first user device corresponding to the consumable content;

transmitting, via the payment circuitry, a first real-time payment to the content source device in an instance in which the real-time payment server dice receives responsive authorization from the first user device, wherein the responsive authorization from the first user device is in response to the actionable payment notification, wherein the first real-time payment to the content source device is irrevocable such that the first real-time payment is immediately accessible to the content source device;

causing, via the access circuitry of the real-time payment server, access of the consumable content to the first user device and the second user device to be maintained in an instance in which the real-time payment server receives responsive authorization from the first user device;

causing, via the payment circuitry to the second user, return of a payment based on the transaction data indicating the ticket purchase for access to the consumable content associated with the second user device in an instance in which the real-time payment server fails to receive responsive authorization from the first user device; and causing, via the access circuitry, access of the consumable content to the first user device and the second user device to halt, in real-time, in an instance in which the real-time payment server fails to receive responsive authorization from the first user device.

2. The method according to claim 1, wherein the transaction data indicating the ticket purchase for access to the consumable content associated with the second user device is included in consumable content identifiers of the content access database.

3. The method according to claim 1, further comprising:
receiving, via the contextual analysis circuitry of the real-time payment server, one or more source contextual parameters of the content source device,
wherein identifying the first user device comprises identifying, via the content evaluation circuitry of the real-time payment server, the first user device based on the first user device being within the threshold proximity of the second user device, the social media data received from the first user device corresponding to the consumable content, and the source contextual parameters.

4. The method according to claim 1, wherein the request for payment further comprises a payment threshold.

5. The method according to claim 4, further comprising causing, via the access circuitry of the real-time payment server, access of the consumable content to the first user device to halt in an instance in which the responsive authorization from the first user device fails to satisfy the payment threshold.

6. The method according to claim 1, further comprising:
providing, via the access circuitry of the real-time payment server, access to the consumable content to a third user device associated with a third user;
identifying, via the content evaluation circuitry of the real-time payment server, the third user device associated with the third user accessing consumable content of the content source device;
transmitting, via the payment circuitry of the real-time payment server, an actionable payment notification to the third user device;
transmitting, via the payment circuitry of the real-time payment server, a second real-time payment to the content source device in an instance in which the real-time payment server receives responsive authorization from the third user device;
causing, via the access circuitry of the real-time payment server, access of the consumable content to the third user device to be maintained in an instance in which the real-time payment server receives responsive authorization from the third user device; and
causing, via the access circuitry of the real-time payment server, access of the consumable content to the third user device to halt in an instance in which the real-time payment server fails to receive responsive authorization from the third user device.

7. The method according to claim 4, further comprising:
compiling, via the payment circuitry of the real-time payment server, the first real-time payment and a second real-time payment; and
causing, via the payment circuitry of the real-time payment server, return of the first real-time payment to the first user device and return of the second real-time payment to the second user device in an instance in which the compiled first and second real-time payments fail to satisfy the payment threshold.

8. A real-time payment system, comprising:
a content source device streaming consumable content associated with a live event;
a first user device associated with a first user;
a second user device associated with a second user; and
a real-time payment server, wherein the real-time payment server is communicatively coupled, via a network, to the content source device, the first user device, and the second user device, wherein the real-time payment server comprises:
access circuitry configured to provide the first user device with access to the consumable content of the content source device;
communications circuitry configured to receive a request for payment from the content source device, wherein the request for payment relates to the first user device and the second user device;
contextual analysis circuitry configured to:
query a content access database to identify transaction data,
determine that the second user device is accessing the consumable content based on the transaction data indicating a ticket purchase for access to the consumable content associated with the second user device;
receive, from the first user device and the second user device, device proximity data comprising global positioning system data or internet protocol address data,
receive, from the first user device, social media data comprising a comment, a message, or a post associated with the consumable content,
compare the device proximity data of the first user device with the device proximity data of the second user device to determine that the first user device is within a threshold proximity of the second user device, and
compare the social media data with the consumable content to determine that the social media data corresponds to the consumable content;
content evaluation circuitry configured to identify, based on the first user device being within the threshold proximity of the second user device and the social media data received from the first user device corresponding the consumable content, that the first user device associated with the first user is accessing the consumable content of the content source device;
payment circuitry configured to:
transmit an actionable payment notification to the first user device in response to identifying that the first user device is accessing the consumable content based on the first user device being within the threshold proximity of the second user device and the social media data received from the first user device corresponding to the consumable content; and
transmit a first real-time payment to the content source device in an instance in which the real-time payment server receives responsive authorization from the first user device, wherein the responsive authorization from the first user device is in response to the actionable payment notification, wherein the first real-time payment to the content source device is irrevocable such that the first real-time payment is immediately accessible to the content source device; and
wherein the access circuitry is further configured to:
cause access of the consumable content to the first user device and the second user device to be maintained in an instance in which the real-time payment server receives responsive authorization from the first user device, cause return, to the second user, of a payment based on the transaction data indicating the ticket purchase for access to the consumable content associated with the second user device in an instance in which the real-time payment server fails to receive responsive authorization from the first user device, and cause access of the consumable content to the first user device and the second user device to halt, in real-time, in an instance in which the real-time payment server fails to receive responsive authorization from the first user device.

9. The real-time payment system according to claim 8, wherein the transaction data indicating the ticket purchase for access to the consumable content associated with the second user device is included in consumable content identifiers stored in the content access database.

10. The real-time payment system according to claim 8, wherein the contextual analysis circuitry is further configured to:

receive one or more source contextual parameters of the content source device, wherein the content evaluation circuitry is configured to identify the first user device based on the first user device being within the threshold proximity of the second user device, the social media data received from the first user device corresponding to the consumable content, and the source contextual parameters.

11. The real-time payment system according to claim 8, wherein the request for payment further comprises a payment threshold.

12. The real-time payment system according to claim 11, wherein the access circuitry is further configured to cause access of the consumable content to the first user device to halt in an instance in which the responsive authorization from the first user device fails to satisfy the payment threshold.

13. The real-time payment system according to claim 8, wherein the access circuitry is further configured to provide access to the consumable content to a third user device associated with a third user, wherein the content evaluation circuitry is further configured to identify the third user device associated with the third user accessing the consumable content of the content source device, and wherein the payment circuitry is further configured to:
transmit an actionable payment notification to the third user device; and
transmit a second real-time payment to the content source device in an instance in which the real-time payment server receives responsive authorization from the third user device, and wherein the access circuitry is further configured to:
cause access of the consumable content to the third user device to be maintained in an instance in which the real-time payment server receives responsive authorization from the third user device; and
cause access of the consumable content to the third user device to halt in an instance in which the real-time payment server fails to receive responsive authorization from the third user device.

14. The real-time payment system according to claim 11, wherein the payment circuitry is further configured to:
compile the first real-time payment and a second real-time payment; and
cause return of the first real-time payment to the first user device and return of the second real-time payment to the second user device in an instance in which the compiled first and second real-time payments fail to satisfy the payment threshold.

15. A non-transitory computer-readable storage medium storing instructions that, when executed, cause a real-time payment server of a real-time payment system to:

provide a first user device of the real-time payment system with access to consumable content of a content source device of the real-time payment system, wherein the consumable content comprises streaming content associated with a live event, wherein the first user device is associated with a first user, and wherein the real-time payment server is communicatively coupled, via a network, to the content source device, the first user device, and a second user device;

receive a request for payment from the content source device, wherein the request for payment relates to the first user device and the second user device of the real-time payment system, wherein the second user device is associated with a second user;

query a content access database to identify transaction data;

determine that the second user device is accessing the consumable content based on the transaction data indicating a ticket purchase for access to the consumable content associated with the second user device;

receive, from the first user device and the second user device, device proximity data comprising global positioning system data or internet protocol address data;

receive, from the first user device, social media data comprising a comment, a message, or a post associated with the consumable content, compare the device proximity data of the first user device with the device proximity data of the second user device to determine that the first user device is within a threshold proximity of the second user device;

compare the social media data with the consumable content to determine that the social media data corresponds to the consumable content;

identify, based on the first user device being within the threshold proximity of the second user device and the social media data received from the first user device corresponding to the consumable content, that the first user device associated with the first user is accessing the consumable content of the content source device;

transmit an actionable payment notification to the first user device in response to identifying, that the first user device is accessing the consumable content based on the first user device being within the threshold proximity of the second user device and the social media data received from the first user device corresponding the consumable content;

transmit a first real-time payment to the content source device in an instance in which responsive authorization is received from the first user device, wherein the responsive authorization from the first user device is in response to the actionable payment notification, wherein the first real-time payment to the content source device is irrevocable such that the first real-time payment is immediately accessible to the content source device;

cause access of the consumable content to the first user device and the second user device to be maintained in an instance in which the real-time payment server receives responsive authorization from the first user device;

cause return, to the second user, of a payment based on the transaction data indicating the ticket purchase for access to the consumable content associated with the second user device in an instance in which the real-time payment server fails to receive responsive authorization from the first user device; and cause access of the consumable content to the first user device and the second user device to halt, in real-time, in an instance in which responsive authorization is not received from the first user device.

16. The non-transitory computer-readable storage medium according to claim 15, wherein the transaction data indicating the ticket purchase for access to the consumable content associated with the second user device is included in consumable content identifiers stored in the content access database.

17. The non-transitory computer-readable storage medium according to claim 15, wherein the instructions, when executed, further cause the real-time payment server to:

receive one or more source contextual parameters of the content source device; and identify the first user device based on the first user device being within the threshold proximity of the second user device, the social media data received from the first user device corresponding to the consumable content, and the source contextual parameters.

18. The non-transitory computer-readable storage medium according to claim 15, wherein the request for payment further comprises a payment threshold.

19. The non-transitory computer-readable storage medium according to claim 18, wherein the instructions, when executed, further cause the real-time payment server to cause access of the consumable content to the first user device to halt in an instance in which the responsive authorization from the first user device fails to satisfy the payment threshold.

20. The non-transitory computer-readable storage medium according to claim 15, wherein the instructions, when executed, further cause the real-time payment server to:

provide access to the consumable content to a third user device associated with a third user;

identify the third user device associated with the third user accessing the consumable content of the content source device;

transmit an actionable payment notification to the third user device;

transmit a second real-time payment to the content source device in an instance in which the real-time payment server receives responsive authorization from the third user device;

cause access of the consumable content to the third user device to be maintained in an instance in which the real-time payment server receives responsive authorization from the third user device; and cause access of the consumable content to the third user device to halt in an instance in which the real-time payment server fails to receive responsive authorization from the third user device.

* * * * *